United States Patent
Liese et al.

(10) Patent No.: US 6,301,414 B1
(45) Date of Patent: Oct. 9, 2001

(54) COMMUNICATION CABLE NETWORK IN A DUCT OR TUBE SYSTEM USED PRIMARILY FOR OTHER PURPOSES

(75) Inventors: Wolfgang Liese, Gehrden; Alexander Weiss, Monchengladbach; Helmut Haag, Titz; Bernd Menze, Hannover, all of (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/398,047

(22) Filed: Sep. 17, 1999

(30) Foreign Application Priority Data

Oct. 1, 1998 (DE) .............................. 198 45 172

(51) Int. Cl.$^7$ ...................................... G02B 6/44
(52) U.S. Cl. .................. 385/103; 385/100; 385/101; 385/102; 385/105; 385/106; 385/107; 385/109; 385/110; 385/112; 385/113
(58) Field of Search .................. 385/100, 102, 385/103, 105–107, 109, 110, 112, 113, 101

(56) References Cited

U.S. PATENT DOCUMENTS

| Re. 34,516 | * | 1/1994 | Houghton | 385/103 |
|---|---|---|---|---|
| 4,097,119 | * | 6/1978 | Kumamaru et al. | 385/102 |
| 4,199,224 | * | 4/1980 | Oestreich | 385/110 |
| 4,342,500 | * | 8/1982 | Oestreich et al. | 385/113 |
| 4,662,712 | * | 5/1987 | Tabata et al. | 385/102 |
| 4,815,813 | * | 3/1989 | Arroyo et al. | 385/102 |
| 4,826,278 | * | 5/1989 | Gartside, III et al. | 385/105 |
| 4,844,575 | * | 7/1989 | Kinard et al. | 385/113 |
| 4,946,237 | * | 8/1990 | Arroyo et al. | 385/107 |
| 5,013,127 | * | 5/1991 | Bernard | 385/107 |
| 5,199,096 | * | 3/1993 | Kathiresan et al. | 385/109 |
| 5,249,248 | * | 9/1993 | Arroyo et al. | 385/113 |
| 5,838,864 | * | 11/1998 | Patel et al. | 385/113 |
| 6,188,821 | * | 2/2001 | McAlpine et al. | 385/100 |

FOREIGN PATENT DOCUMENTS 197 01 787-A * 7/1998 (DE).
19734274A1 * 2/1999 (DE).

* cited by examiner

*Primary Examiner*—Evelyn A Lester
(74) *Attorney, Agent, or Firm*—Sughrue, Mion, Zinn, Macpeak & Seas, PLLC

(57) ABSTRACT

A communications cable network, in a duct or tube system used primarily for other purposes, wherein the communications cables are mounted on the walls of the duct or tube system. The communications cable (3), is made of a core (7–10) and a sheath (11). The core (7–10) of the communications cable (3) is extremely flexible and the sheath (11) is sufficiently rigid that cable sag is less than 20 mm for a 2000-mm distance between fastenings. The sheath (11) is removed from the core (7–10) in the area of the shafts (2) of the duct or pipe system (1).

15 Claims, 1 Drawing Sheet

COMMUNICATION CABLE NETWORK IN A DUCT OR TUBE SYSTEM USED PRIMARILY FOR OTHER PURPOSES

This application is based on and claims the benefit of German Patent Application No. 198 45 172.5 filed Oct. 1, 1998, which is incorporated by reference herein.

BACKGROUND OF THE INVENTION

The invention relates to a communications cable network in a duct or pipe system primarily used for other purposes in accordance with the preamble of claim 1.

DE 197 01 737 A discloses a method for installing optical fiber cables in accessible or non-accessible water, sewage, or rainwater ducts, or also gas pipes. This ensures that the fiber optic cables can be installed in simple manner all the way into the individual buildings without costly earthwork. The fiber optic cables are fastened to the inner wall of the ducts or pipes by means of straps using a remote control duct robot. The fiber optic cable used here has an outer metal protective tube holding the optical waveguides. Many such fiber optic cables can be fastened next to each other on the walls. The fiber optic cables can also extend within cable conduits, i.e. the cable conduits are first fastened to the wall and the fiber optic cable is subsequently pulled or blown into the cable conduit. A disadvantage of this method is that it requires two operations to install the fiber optic cable, namely installing the cable conduit and pulling in the fiber optic cable. As mentioned above, the fiber optic cables have an outer metal tube with good bending properties combined with good stability. Due to these good bending properties, the straps have to be spaced relatively closely, for example, at a distance of 1–2 m to prevent marked sagging by the cable. The good bending properties must make it possible for the cable, as it exits the conduit end enters the shaft in the case of a sewage pipe, to bend by 90° within a relatively small space without kinking of the metal tube.

SUMMARY OF THE INVENTION

An object of the invention is to provide a cable for a communications cable network of the initially described type, which on the one hand is rigid but can be wound onto conventional cable drums for transport and on the other hand can be readily transformed into an easily bendable communications cable.

This object is attained by the features set forth in the characteristic part of claim 1.

The essential advantage of the invention is that it provides two different cables in one. The cable core is designed as a self-contained, fully functional cable. The combination cable core and sheath is a relatively rigid structure, whereas the cable without its sheath is highly flexible. The cable without its sheath can be installed directly in the ground, in empty pipes in the ground, or in ducts.

Additional advantageous embodiments of the invention are set forth in the subclaims.

BRIEF DESCRIPTION OF THE DRAWING

Below, the invention is further explained by means of the exemplary embodiment schematically depicted in FIGS. 1 and 2.

DETAILED DESCRIPTION OF THE INVENTION

Figure 1:
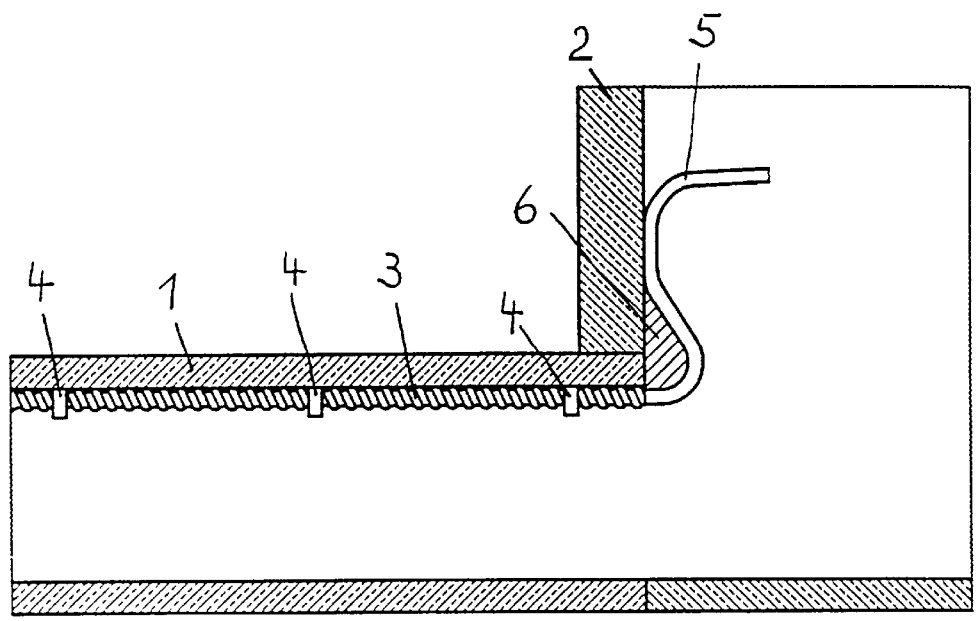

FIG. 1 shows a partial view of a non-accessible duct system consisting of a sewage pipe 1, which opens out into an accessible shaft 2. On the wall of this sewage pipe 1, a communications cable 3 is attached by fastening elements 4. The communications cable 3 is very rigid within sewage pipe 1 so that there is practically no, or extremely little, sag of communications cable 3 between two fastening elements 4. Due to the rigidity of communications cable 3, the mutual distance between fastening elements 4 can be selected very large, for example over 1 m, to obtain high installation rates. The communications cable 3, as known from DE 197 01 787 A, in the case of a non-accessible sewage pipe, is guided by a duct robot to the upper wall of duct 1 and fixed by the fastening elements. At the exit location of cable 3 from sewage pipe 1, the rigid sheath of the cable is removed and the cable core 5 enters the interior of shaft 2. Cable core 5 is designed as a fully functional cable and is much more flexible than cable 3.

At the junction between sewage pipe 1 and shaft 2, a bending aid 6 is provided, which prevents cable core 5 from being bent beyond its minimum bending radius.

The cable core 5 can be guided, for example, in a cable conduit as an underground cable or in a supply pipe (gas, water, etc.) into a building. On the other hand cable core 5 can be run to a coupling (not depicted) in shaft 2.

Figure 2:
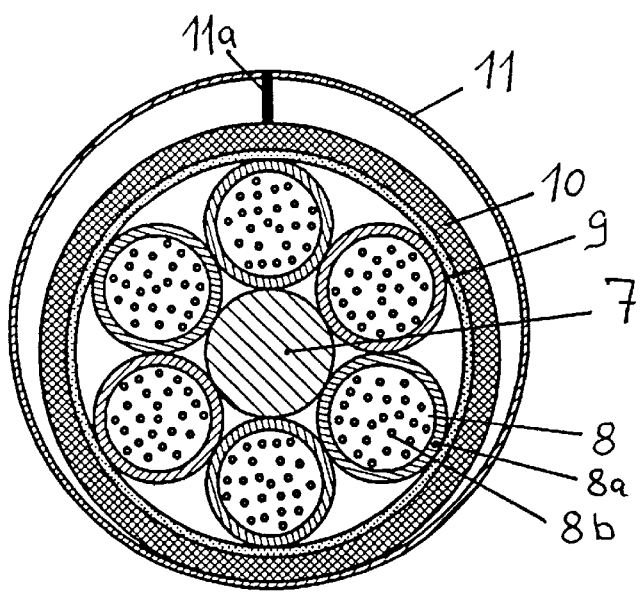

FIG. 2 shows a communications cable comprising a core and a sheath.

The core has a central element 7, e.g., made of polyaramide, around which six buffered fibers 8 are stranded. The buffered fibers 8 can be stranded around central element 7 or can be applied by SZ stranding.

Each buffered fiber 8 comprises a fiber jacket 8a in which the optical waveguides 8b extend. The buffered fibers 8 can moreover be filled with a gel-type material to prevent longitudinal water migration. Each buffered fiber 8 has twenty-four optical waveguides 8b.

Around buffered fiber 8, a band 9 is placed, which is made of a swelling non-woven material and swells up when water enters so as to make the cable core longitudinally watertight. Band 9 is preferably applied helically.

An intermediate sheath 10 made of sewage-water resistant polyethylene is extruded onto band 9.

Alternatively, the intermediate sheath 10 can be made of polypropylene, polyurethane, polyvinyl chloride, or similar plastics.

The intermediate sheath 10 can also be multi-layered. For many applications, it may be advantageous first to apply a polyethylene layer by extrusion, to place braiding or a band of high-quality steel around this first layer, and then to apply a second layer of polyethylene by extrusion. This second layer should be made of sewage-water resistant polyethylene.

The cable core composed of the described elements 7–10 is a fully functional cable and can thus be installed underground, pulled into cable conduits, or used in line networks. Essential for the invention is the adequate flexibility of the cable core. For example, the cable core should have a bend radius of less than 200 mm. Over the cable core, a cable sheath 11 is applied consisting of a metal tube, preferably made of stainless steel. The cable sheath 11 is made, as known per se, from a longitudinally fed metal band, which is formed into a tube and welded along its longitudinal edges (see weld seam 11a) in a continuous operation. The metal band thus sheathes the cable core, which is also longitudinally fed. In addition to flexibility, it is desirable for the communications cable 3 to have a small diameter, such as no more than 15 mm.

The metal tube is corrugated after welding. The corrugation can be optimized with respect to the corrugation depth and the corrugation pitch to suit a specific application. It is essential, however, that the cable sheath 11 is designed so that cable sheath 11 and cable core (7–10) can be easily detached from each other and that the rigidity of the cable is such that on the one hand it can be wound onto a cable drum for transport and that on the other hand its sag in a horizontal installation does not exceed 20 mm for a 2000-mm distance between two fastening point. Due to the corrugation, the transverse compressive strength of cable sheath 11 is high. At the same time, metal sheath 11 serves as rodent protection.

The cable sheath can also be made of hard plastic, whereby it must be ensured that the cable sheath can be easily detached from the cable core. Metallic layers should then be incorporated in the cable sheath; e.g., braiding made from high-grade steel wires or a metal band. These metallic layers on the one hand are to serve as rodent protection and on the other hand are to give the cable sheath high tensile strength.

The interstice between the outer sheath 11 and the cable core 7–10 may be filled with a swelling material or with foamed plastic to provide a longitudinal water seal.

What is claimed is:

1. A communications cable network, in a duct or pipe system having shafts, whereby the communications cables are attached to the walls of the duct or pipe system, said network characterized in that:

said communications cable comprises a core and a sheath, wherein said core is flexible, and wherein said sheath is sufficiently rigid that cable sag is less than 20 mm for a 2000-mm distance between fastenings, and wherein said sheath is removed from the core in the area of the shafts of the duct or pipe system.

2. A communications cable network according to claim 1 wherein the sheath is a longitudinally welded metal tube.

3. A communications cable network according to claim 2 wherein the metal tube is corrugated.

4. A communications cable network according to claim 3 wherein the tube is made of high-quality steel.

5. A communications cable network according to claim 1 wherein the sheath is made of a hard plastic.

6. A communications cable network according to claim 1 wherein the core of the communications cable has a bending radius of less than 200 mm.

7. A communications cable network according to claim 1 wherein the core of the communications cable is made of a stranded structure of communications conductors and an intermediate sheath arranged over the stranded structure.

8. A communications cable network according to claim 7 wherein the intermediate sheath is a braid of metal and/or plastic threads.

9. A communications cable network according to claim 7 wherein the intermediate sheath is an extruded plastic sheath.

10. A communications cable network according to claim 8 wherein an extruded plastic sheath is disposed over the braiding.

11. A communications cable network according to claim 7 wherein a band of a swelling non-woven material is arranged between the stranded structure and the inner sheath.

12. A communications cable network according to claim 1 wherein the communications cable is a fiber optic cable.

13. A communications cable network according to claim 1 wherein the outside diameter of said communications cable is no more than 15 mm.

14. A communications cable network according to claim 5, wherein the sheath is made of a polyethylene.

15. A communications cable network according to claim 5, wherein the sheath is made of a polyvinyl chloride.

* * * * *